P. BOYD & J. A. HOCK.
PIPE COUPLING OR JOINT.
APPLICATION FILED NOV. 21, 1908.
918,954.
Patented Apr. 20, 1909.
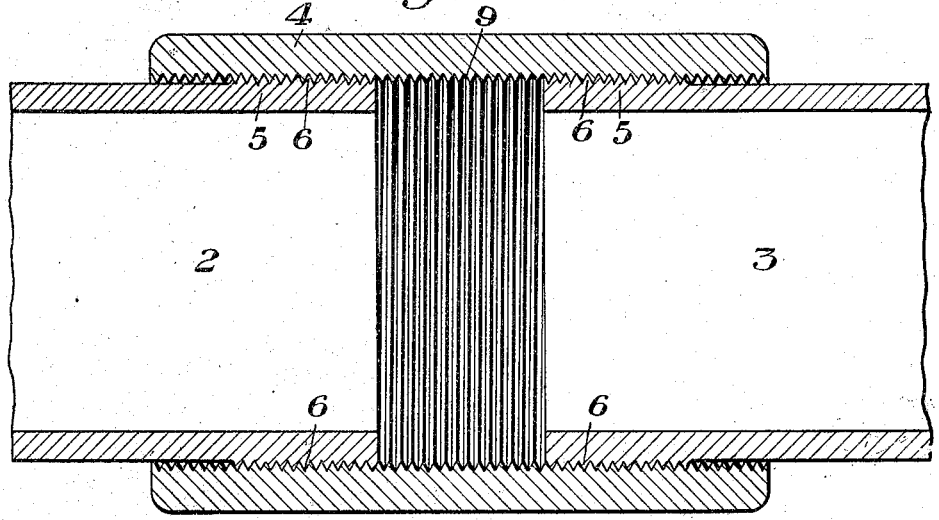
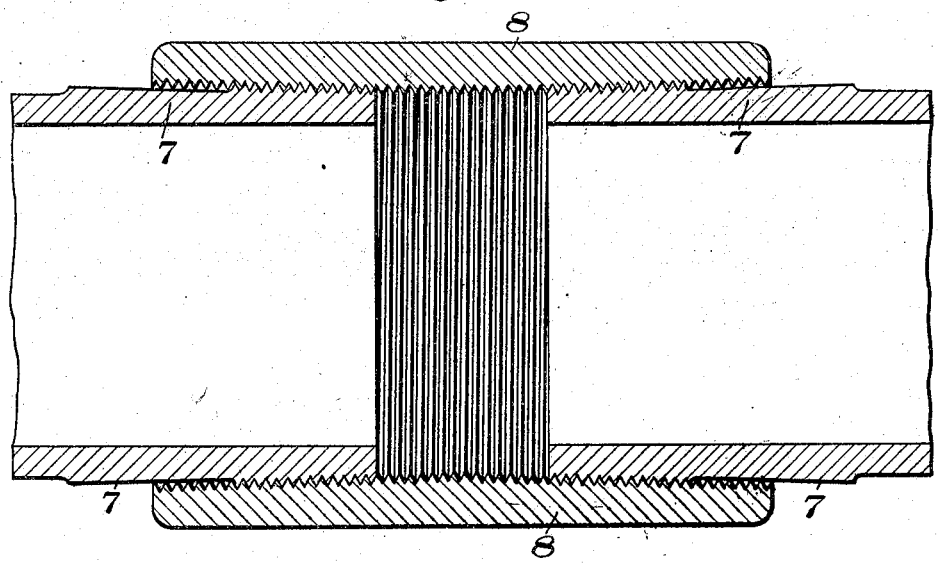
WITNESSES
INVENTORS

UNITED STATES PATENT OFFICE.

PETER BOYD AND JOHN A. HOCK, OF PITTSBURG, PENNSYLVANIA, ASSIGNORS TO NATIONAL TUBE COMPANY, OF PITTSBURG, PENNSYLVANIA, A CORPORATION OF NEW JERSEY.

PIPE COUPLING OR JOINT.

No. 918,954.     Specification of Letters Patent.     Patented April 20, 1909.

Application filed November 21, 1908. Serial No. 463,799.

*To all whom it may concern:*

Be it known that we, PETER BOYD and JOHN A. HOCK, both of Pittsburg, Allegheny county, Pennsylvania, have invented a new and useful Improvement in Pipe Couplings or Joints, of which the following is a full, clear, and exact description, reference being had to the accompanying drawings, forming part of this specification, in which—

Figures 1 and 2 are longitudinal sections of two different forms of pipe joints or couplings embodying our invention.

Our invention relates to the class of pipe couplings or joints and is designed to provide a simple and efficient form of coupling in which the weakening effect of threading the ends of the connected pipe sections is overcome; in which the coupling is provided with an extended bearing upon the end portions of the connected pipe sections beyond their threads; and in which provision is made for bringing new threads into use to maintain the security of the coupling in case the threads originally used become worn.

The precise nature of our invention will be best understood by reference to the accompanying drawings, in which we have shown two forms of our invention, and which will now be described, it being premised, however, that various changes may be made in the details of construction and arrangement of the parts without departing from the spirit and scope of our invention as defined in the appended claims.

Referring first to Fig. 1, the numerals 2 and 3 designate the end portions of the two sections of pipe to be united and 4 designates the coupling sleeve. The end portion of each of the pipes 2 and 3 is upset or thickened as shown at 5 and this upset or thickened portion is provided with exterior screw threads 6. The coupling sleeve 4 is provided with an internal thread extending preferably throughout its entire length, this thread engaging the thread 6 of the pipe members and also extending past the thread 6 so that the points of these threads at the end portions of the sleeve have a bearing upon the plane, unthreaded outer surface of the pipe members beyond the threads 6 as clearly shown in the drawing.

The construction shown in Fig. 2 is similar to that shown in Fig. 1, except that the end portions of the pipe members are tapered as shown at 7 and the coupling member 8 has a complementary taper in both directions from its center. It is well known that in the ordinary threaded pipe couplings of this general class, the coupling is greatly weakened by the threading of the end portions of the pipe members. By upsetting the end portions of the pipe members to an extent equal to the depth of the thread, we avoid this weakening and particularly at the points where the threads commence. By extending the ends of the coupling member or sleeve beyond the threaded end portions of the pipe members and causing the teeth of the threads on the sleeve to bear upon the unthreaded portion of the pipe members, the coupling member or sleeve is given a bearing throughout its entire length and the coupling is thereby greatly stiffened.

It will be noted as shown in Figs. 1 and 2, that a considerable initial space 9 is left between the adjacent ends of the pipe members 2 and 3. The provision of this space enables either pipe member to be screwed in to a greater extent and thus take a bearing upon new threads in the coupling sleeve at any time.

We claim:—

1. A pipe coupling comprising pipe members having upset exteriorly threaded end portions and a coupling sleeve having an interior thread engaging the threads of said end portions and also engaging the unthreaded portions of the pipe members beyond their threaded end portions; substantially as described.

2. A pipe coupling comprising pipe members having upset end portions formed with exterior threads and a coupling sleeve having an interior thread throughout its length engaging the exterior thread of the pipe members and also extending beyond said exterior threads and bearing upon the unthreaded portions of the pipe members; substantially as described.

3. A pipe coupling comprising pipe members having exteriorly threaded end portions thickened to an extent equal to the depth of the exterior threads formed thereon and a coupling sleeve internally threaded and engaging the exterior threads of the pipe members and also having its threads bearing upon the unthreaded portions of the pipe members; substantially as described.

4. A pipe coupling comprising pipe members having thickened exteriorly threaded end portions, and a coupling sleeve having a continuous internal thread of a length materially greater than the combined length of the external threads of the pipe members; substantially as described.

5. A pipe coupling comprising pipe members having exteriorly threaded thickened end portions, and a coupling sleeve threaded interiorly from end to end of a length greater than the combined length of the exteriorly threaded portions of the two pipe members, whereby the threads at the end portions of the sleeve bear upon unthreaded portions of the pipe members; substantially as described.

In testimony whereof, we have hereunto set our hands.

PETER BOYD.
JOHN A. HOCK.

Witnesses:
RENALD AILES,
H. M. CORWIN.